US007598955B1

(12) United States Patent
Dowling et al.

(10) Patent No.: US 7,598,955 B1
(45) Date of Patent: Oct. 6, 2009

(54) HINTED STEM PLACEMENT ON HIGH-RESOLUTION PIXEL GRID

(75) Inventors: Terence S. Dowling, San Jose, CA (US); R. David Arnold, Mountain View, CA (US)

(73) Assignee: Adobe Systems Incorporated, San Jose, CA (US)

( * ) Notice: Subject to any disclaimer, the term of this patent is extended or adjusted under 35 U.S.C. 154(b) by 212 days.

(21) Appl. No.: 09/739,587

(22) Filed: Dec. 15, 2000

(51) Int. Cl.
*G06T 15/00* (2006.01)

(52) U.S. Cl. ........................ 345/469; 345/442; 382/166; 382/190; 382/276; 709/201

(58) Field of Classification Search ................. 345/419, 345/442–469; 382/166, 190, 276; 709/201, 709/202
See application file for complete search history.

(56) References Cited

U.S. PATENT DOCUMENTS

| | | | | |
|---|---|---|---|---|
| 4,675,830 | A * | 6/1987 | Hawkins | 345/666 |
| 4,907,282 | A | 3/1990 | Daly et al. | |
| 5,280,577 | A | 1/1994 | Trevett et al. | |
| 5,304,989 | A | 4/1994 | Martinez et al. | |
| 5,325,479 | A | 6/1994 | Kaasila | |
| 5,664,086 | A | 9/1997 | Brock et al. | |
| 5,673,371 | A | 9/1997 | Koopman et al. | 395/110 |
| 5,684,510 | A | 11/1997 | Brassell et al. | |
| 5,808,600 | A | 9/1998 | Mochizuki | |
| 5,852,448 | A | 12/1998 | Cheng | |
| 5,909,221 | A | 6/1999 | Nakai et al. | |
| 5,910,805 | A | 6/1999 | Hickey et al. | |
| 5,943,063 | A * | 8/1999 | Dowling | 345/471 |
| 5,959,634 | A | 9/1999 | Yoshida | |
| 6,104,833 | A | 8/2000 | Naoi et al. | |
| 6,128,415 | A | 10/2000 | Hultgren et al. | |
| 6,141,441 | A | 10/2000 | Cass et al. | |
| 6,229,521 | B1 | 5/2001 | Yip | |
| 6,266,444 | B1 | 7/2001 | Yoshida | 382/202 |
| 6,288,725 | B1 | 9/2001 | Fu | |

(Continued)

FOREIGN PATENT DOCUMENTS

EP 1 077 445 2/2001

(Continued)

OTHER PUBLICATIONS

Taligent Documentation, "Miter limit joint" [online],1995 [retrieved on Mar. 8, 2007]. Retrieved from the Internet: <URL: http://www.cubik.org/mirrors/taligent/Docs/books/GS/GS_134.html>1 page.

(Continued)

*Primary Examiner*—Phu K Nguyen
(74) *Attorney, Agent, or Firm*—Fish & Richardson P.C.

(57) ABSTRACT

Methods and apparatus implementing a technique for rendering a hinted character for display in grayscale on a grayscale output device in accordance with a hinted stem placement policy. In one embodiment, the policy is a black-edge policy, by which a hinted stem is moved so that at least one of the hinted stem edges aligns with an edge of a device cell (which corresponds to an output device pixel). In another embodiment, the policy is an unbiased-stems policy, by which a hinted stem is moved a minimum distance to have it span a minimum number of device cells.

46 Claims, 5 Drawing Sheets

U.S. PATENT DOCUMENTS

| | | | | |
|---|---|---|---|---|
| 6,342,890 | B1 | 1/2002 | Shetter | |
| 6,356,278 | B1 | 3/2002 | Stamm et al. | |
| 6,369,902 | B1 | 4/2002 | Beaman et al. | |
| 6,408,109 | B1 | 6/2002 | Silver et al. | |
| 6,438,576 | B1 | 8/2002 | Huang et al. | |
| 6,459,431 | B1 | 10/2002 | Browne et al. | |
| 6,897,879 | B2 * | 5/2005 | Lyapunov et al. | 345/613 |
| 7,190,367 | B2 * | 3/2007 | Perry et al. | 345/506 |
| 2001/0048764 | A1 | 12/2001 | Betrisey et al. | |
| 2002/0093476 | A1 | 7/2002 | Hill et al. | |

FOREIGN PATENT DOCUMENTS

| | | |
|---|---|---|
| WO | WO 94/06094 | 3/1994 |
| WO | WO 94/29843 | 12/1994 |
| WO | 00/52673 | 9/2000 |

OTHER PUBLICATIONS

Wikipedia, “Transformation matrix” [online], [retrieved on Mar. 8, 2007]. Retrieved from the Internet: <URL: http://en.wikipedia.org/wiki/Matrix_transformation>5 pages.

* cited by examiner

HINTED STEM PLACEMENT ON HIGH-RESOLUTION PIXEL GRID

BACKGROUND OF THE INVENTION

The present invention relates to the rendering of characters for display on devices having grayscale pixels. Grayscale pixels are pixels capable of displaying a number of tones, typically from pure light to pure dark.

U.S. Pat. No. 5,943,063 ("the '063 patent") describes the creation of anti-aliased characters for a computer output device such as a cathode ray tube (CRT) monitor or a liquid crystal display (LCD) device. In particular, the '063 patent, the disclosure of which is incorporated here by reference, describes techniques for placing hinted character stems on a high-resolution grid that is later down-sampled for anti-aliased text rendering on a coarse grid—that is, a grid coarser than the high-resolution grid—of grayscale pixels.

SUMMARY OF THE INVENTION

The invention provides improved apparatus and methods of hinted stem placement on a device pixel grid.

In general, in one aspect, the invention provides a new hinted stem placement policy that is referred to as an unbiased-stems policy. This policy places a hinted stem so that it marks the smallest possible number of full device pixels with the least possible movement of the hinted stem center.

In general, in another aspect, the invention provides a new hinted stem placement policy that is referred to as a black-edge policy. This policy places a hinted stem such that at least one edge of a stem that covers more than one device pixel is on a device pixel boundary. This avoids drawing a stem with, for example, two gray pixels. Each stem is adjusted separately so that it has at least one black edge. This is accomplished with as small a move as possible, either left or right, for a vertical stem, or up or down, for a horizontal one.

The invention can be implemented to realize one or more of the following advantages. The new policies introduce less distortion than do prior art policies. The black-edge policy ensures that if more than one coarse pixel is marked across a stem, there will be at most one gray pixel there. The unbiased-stems policy ensures that the minimum number of coarse pixels are marked. An advantage of the black-edge policy is that it generates fewer gray pixels than other policies, which makes the result look sharper to some people. An advantage of the unbiased-stems policy is that it provides more possible locations for the center of a marked area than does the black-edge policy, for example.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference symbols in the various drawings indicate like elements.

DETAILED DESCRIPTION

Figure 1:
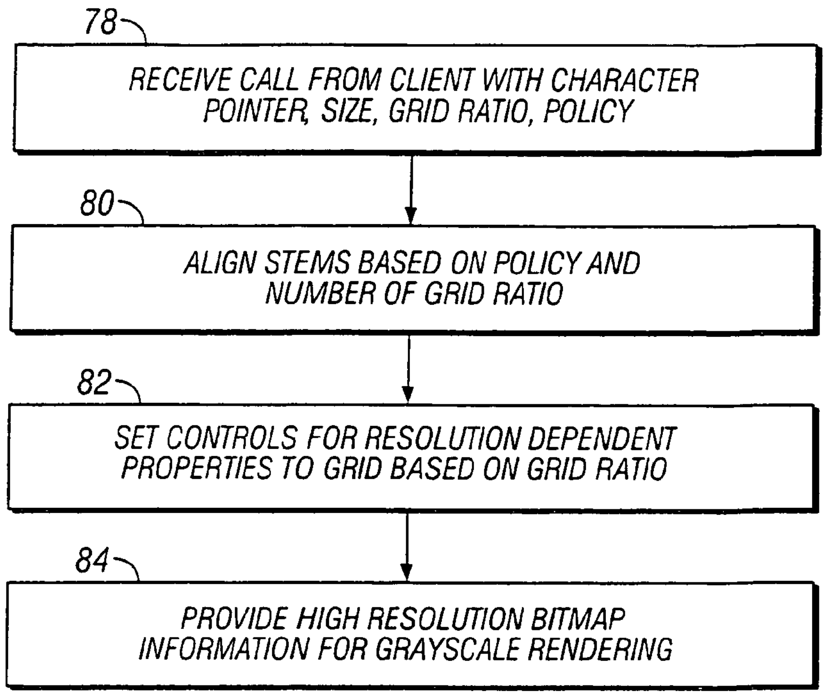
FIG. 1 is a flowchart of a process in accordance with the invention.

As shown in FIG. 1, a process for creating a high-resolution bitmap to create anti-alias characters on a grayscale output device receives a call from a client with a character pointer, a size, a grid ratio, and a policy (step 78). The client can be a device or a program, utility, or other process that requests a high-resolution bitmap that can be further processed and displayed on an output device. Thus, a client might be a word processing program or it might be part of a larger character rendering process (a "renderer").

The grid ratio will generally be determined according to the number of grayscales available on an intended output device. The number of grayscales is typically defined either by the client or by the user of the output device. For example, if the device has a pixel bit-depth of 4 (that is, if a device pixel can produce $2^4$=16 different grayscale shades), then a grid ratio of 4 (producing a 4×4 grid of fine cells in each coarse cell) would generally be the lowest suitable grid ratio. However, a higher grid ratio can be selected by the client to provide more information for the process of down sampling from the fine grid to device pixels.

Next, the process aligns stems of the character based upon the policy dictated by the client and by the grid ratio specified by the client (step 80). The process of the invention differs from the prior art in this step, where it implements two new policies that advantageously produce characters at small character sizes having both good contrast and low distortion. The policy can be selected dynamically by the renderer or the client, or it can be predetermined by the creator of the renderer.

Figure 4:
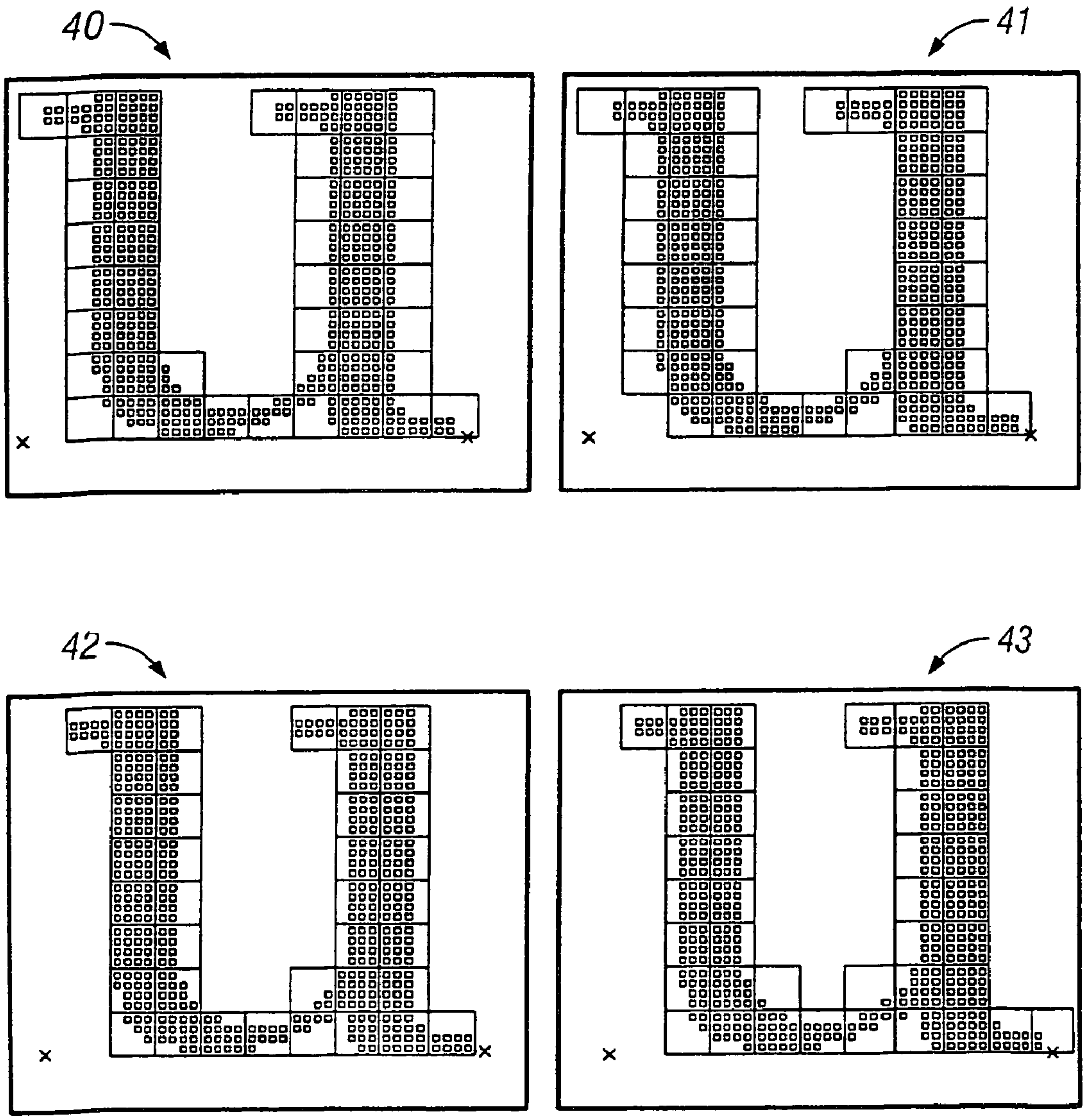
FIGS. 4-6 illustrate high-resolution renderings created in accordance with the invention and otherwise.
Figure 5:
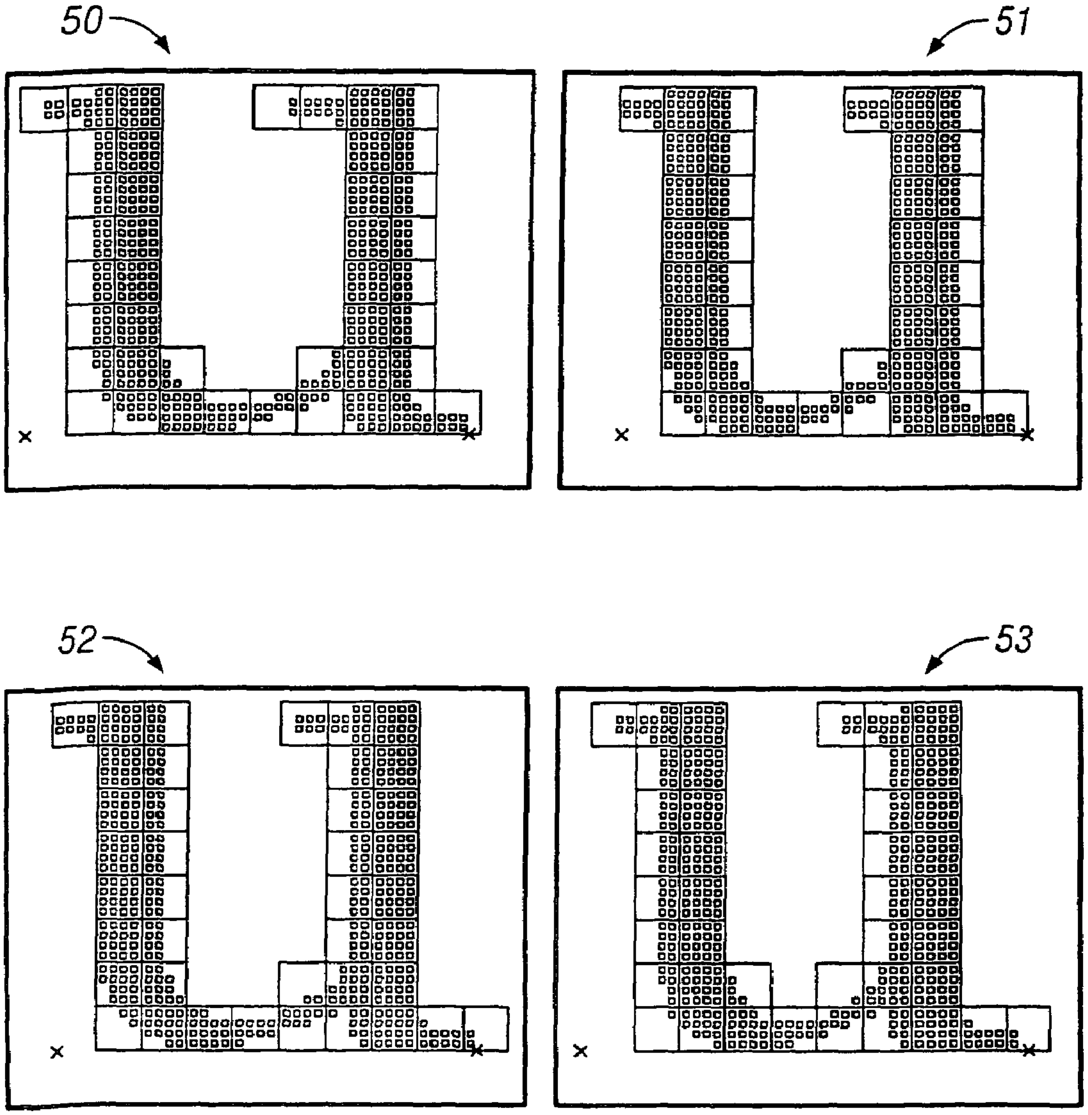
Figure 6:
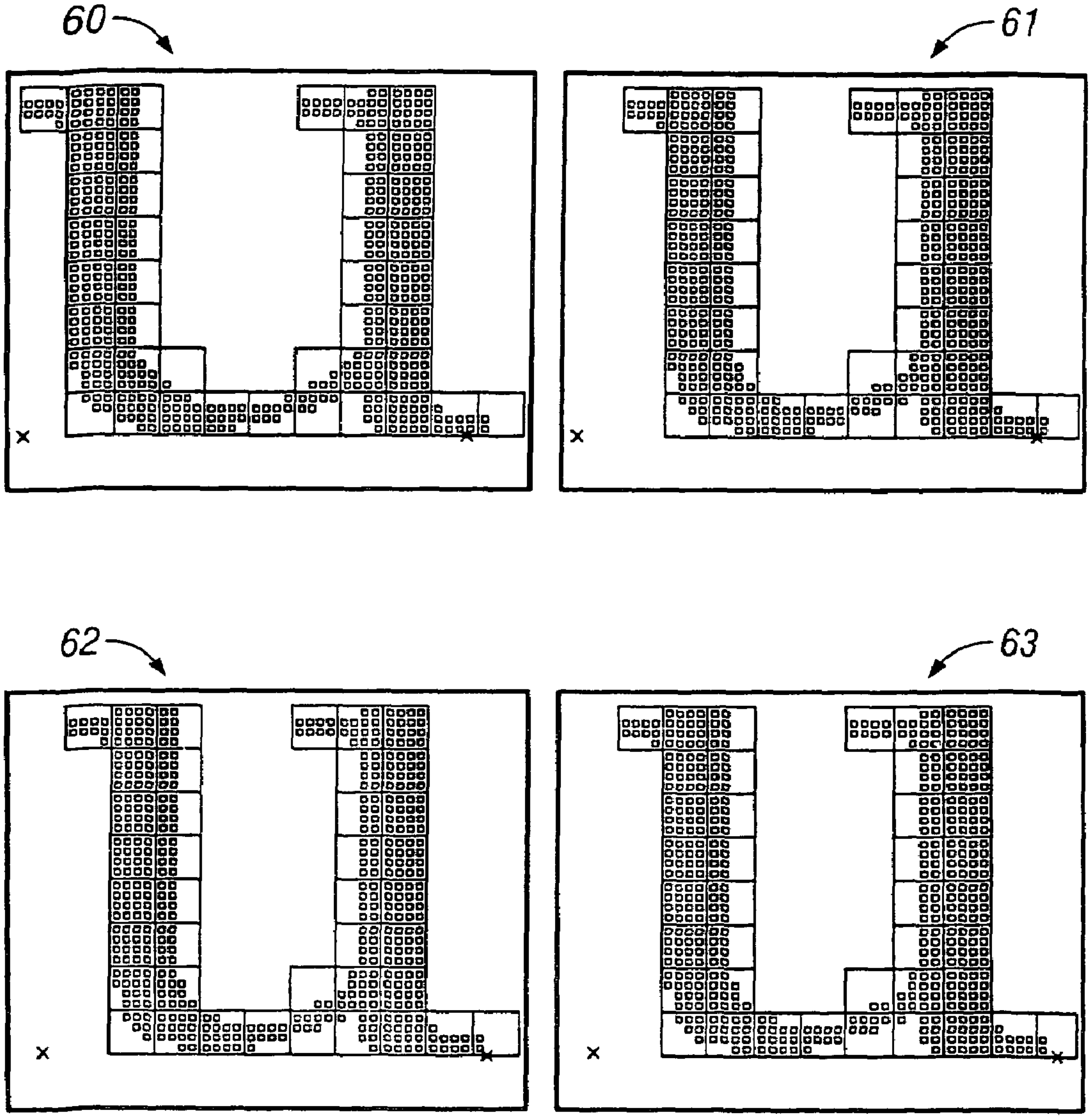

After the stems of the character have been aligned, controls are set for resolution-dependent properties based on the grid ratio (step 82). For example, device dependent property adjustments, such as spot size (ratio of apparent pixel size to physical pixel size), can be handled in this step. Finally, a high-resolution bitmap is provided to the client (step 84). Typically, the client manages the grayscale rendering (that is, the down sampling) of the high-resolution bitmap, although such grayscale rendering can also be accomplished within the rendering process itself as mentioned previously. Examples of high-resolution bitmaps created in accordance with the invention and otherwise are shown in FIGS. 4-6, which will be described later.

Figure 2:
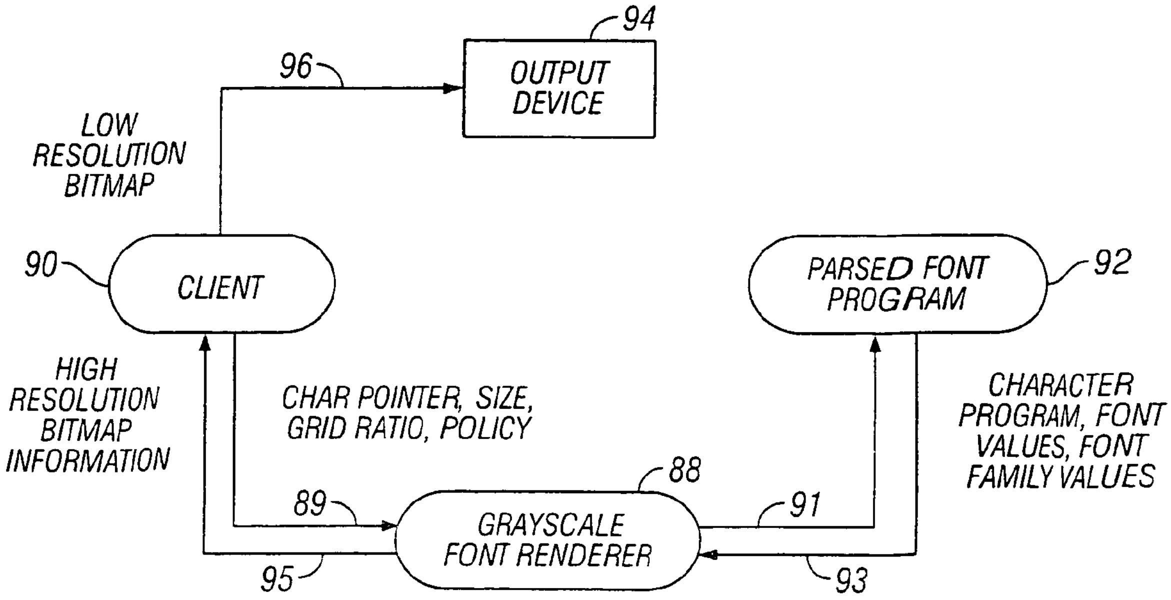
FIG. 2 is a diagram of data flow in a system in accordance with the invention.

FIG. 2 illustrates step 78 of FIG. 1 in greater detail. A grayscale font renderer 88 receives a call 89 from a client 90. The call includes a character pointer, a character size, a grid ratio, and a policy. The renderer 88 creates a call 91 to a parsed font program 92, which returns a character program (to create the font outline of the character), font values, and font family values 93. The renderer 88 then passes a high-resolution bitmap 95 to the client 90, which does the grayscale rendering and, typically, sends a low resolution pixel map 96 to an output device 94. The parsed font program can be a program such as described in the book Adobe Type 1 Font Format, Version 1.1 ("Type 1 Format"), available from Adobe Systems Incorporated of San Jose, Calif.

Figure 3:
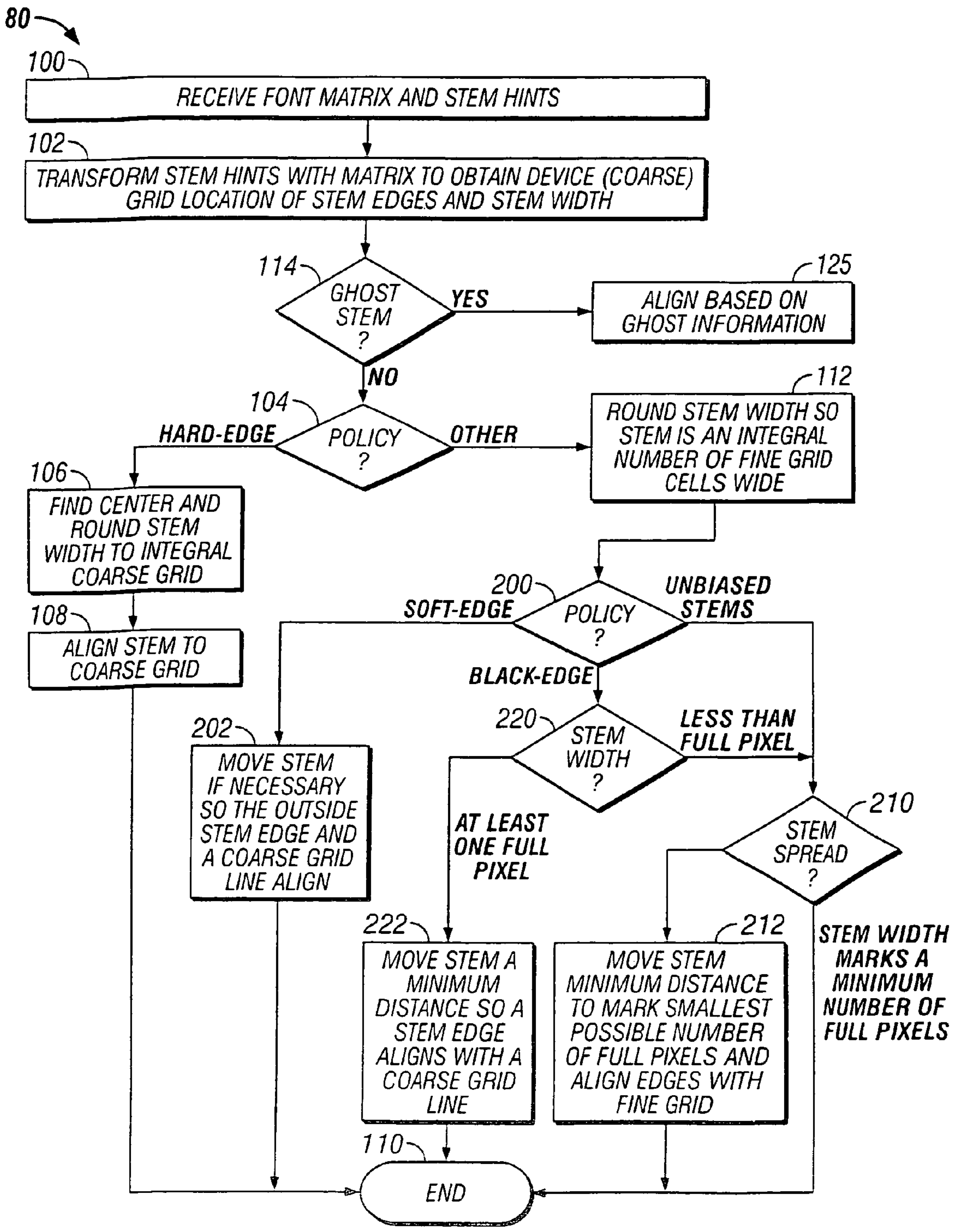
FIG. 3 is a diagram of data flow in a system in accordance with the invention.

FIG. 3 illustrates step 80 of FIG. 1 in greater detail. First, the font matrix and stem hints (i.e., stem hint values) are received from the parsed font program 92 (step 100). This data is described in the Type 1 Format reference. The font matrix applies to the entire font and so may be received only once. When a scaling, rotation, or other transformation is to be applied, a transformation matrix is applied to the font matrix to yield a current matrix; otherwise, the font matrix is the current matrix. The current matrix is used to transform font units to fine cell units. Next, the renderer transforms the stem hints with the current matrix to obtain (i) device grid locations of the stem edges and (ii) stem widths (step 102). The locations and widths are calculated with high precision. In the present context, a stem is either horizontal or vertical. As a consequence, stem alignment of the present invention does not affect the appearance of diagonal stems, except incidentally as result of a diagonal stem's being attached to vertical or horizontal stems that have been affected.

Then, each stem is processed as will now be described.

If the stem is a "ghost" stem ("yes" branch from decision step 114), it is aligned to the coarse grid according to its ghost stem information (step 125). Ghost stems are described in Type 1 Format and, briefly, are stems that have only one edge to control.

Otherwise, the processing proceeds according to the policy (decision step 104).

If the policy is "hard-edge" or "soft-edge", the process proceeds as described in the '063 patent. Under the hard-edge policy, vertical and horizontal stems are made perfectly black, i.e., grayscale is not used, and only curves and diagonals are subject to grayscale-type anti-aliasing. The soft-edge policy, on the other hand, permits anti-aliasing of the horizontal and vertical stems. Hard-edge policy tends to make sharper, darker stems, but may suffer from quantization effects. Soft-edge policy generates a smoother stem, but it may seem fuzzy to some viewers.

If the hard-edge policy is chosen, the process rounds the stem width to an integral coarse grid size (step 106), that is, to an integer multiple of a coarse grid cell width. Next, the stem is aligned to the coarse grid (step 108), which means the width of the stem completely fills one or more pixels, and the processing of the stem is complete (step 110).

If any other policy is selected ("other" branch from decision step 104), the process rounds the stem width to an integral multiple of the high-resolution grid cell size (step 112). Then, if the other policy is no policy, the processing of the stem is complete.

If the soft-edge policy is selected ("soft-edge" branch from decision step 200), the stem is aligned to the coarse grid so that the outside stem edge and a coarse grid line are aligned (step 202). The stem is moved the minimum distance necessary, if any, in either direction perpendicular to its edges, to achieve this alignment. A stem hint defines two edges, and the outside stem edge is the one that is farthest away from the center of the character. To simplify processing, an approximate value can be used for the center rather than calculating an exact center. If the center of the stem passes through the center of the character, either edge may be chosen for alignment.

It should be noted that a reference to a stem edge in this specification in general refers to an edge as defined by a stem hint. A stem hint defines two parallel edges. Thus, a stem edge, as defined by a stem hint, will be straight even when the character outline of the stem is rounded, as in the case of the left and right sides of the letter "O".

If the unbiased-stems policy is chosen ("unbiased stems" branch from decision step 200), the stem spread is considered—that is, how many coarse grid cells (each of which corresponds to a device pixel) are marked or painted by the stem (decision step 210). If the stem width is expressed in units of coarse grid cell width, so that a stem having a width of 1.6 is 1.6 times as wide as a coarse grid cell, then the minimum number of coarse grid cells a stem can paint is found by rounding the stem width up to the next whole number. Thus, a stem of width 1.6 can paint no fewer than two coarse grid cells. If the stem paints a minimum number of coarse grid cells, the processing of the stem is complete (step 110). Otherwise, the stem is moved the minimum distance necessary, in either direction perpendicular to its edges, so that the stem only paints the minimum necessary number of coarse grid cells (step 212). The movement is made to position the stem so that its edges align with the fine (high-resolution) grid. (Recall that the stem width is the width of an integral number of fine grid cells.) The processing of the stem is complete (step 110).

If the black-edge policy is chosen ("black-edge" branch from decision step 200), the stem width is considered (decision step 220). If the stem is not at least one full coarse grid cell (that is, one full device pixel) wide, the process proceeds to decision step 210. Otherwise, the process moves the stem, if necessary, the minimum distance required, in either direction, so that at least one stem edge aligns with a coarse grid line. The processing of the stem is complete (step 110).

The black-edge and unbiased-stems policies are new. It may be noted that the prior art soft-edge policy and the new black-edge policy are, in a sense, extensions of the unbiased-stems policy. All three policies mark the minimum number of coarse pixels. The unbiased-stems policy does not move the stem except to achieve minimum coarse pixel coverage. The black-edge policy does the same thing, but may move the stem a bit farther to get one stem edge aligned with the coarse grid. And the soft-edge policy goes even further in that it moves the stem to get a specific stem edge aligned with the coarse grid.

The client can select policies that are each specific to a particular stem. More typically, the client selects a policy for horizontal stems and possibly a different policy for vertical stems.

FIG. 4 shows the character "u" as delivered to a client (transfer of bitmap 95, FIG. 2) when no policy is in effect for vertical stems. (To simplify the illustration, the characters were hinted in y-direction, to align them to the baseline and x-height.) Vertical stems are accurately placed (5.25 pixels apart), but this results in gray-black-gray or gray-gray pixel combinations that appear softer than gray-black. The grid ratio is 4 so the character appears at four different positions or phases of 0, 1, 2, and 3 fine cells (40, 41, 42, and 43) relative to the coarse pixel grid. The coarse pixels or cells are shown in outline; the fine cells that are marked are shown as gray squares. The unmarked fine cells are shown implicitly.

FIG. 5 shows the same character as delivered when the black-edge policy is in effect for vertical stems. The grid ratio is 4 and the four phases 50, 51, 52, and 53 are shown. As is shown, the stems are aligned to the nearest device pixel edge, shifting either left or right. This reduces the shape distortion while maintaining sharp stems. Vertical stems are 5 or 5.5 pixels apart. In general, stems with a width of n.5 pixels (that is, having a fractional part that is 0.5 device pixels) move in steps of zero or 0.5 pixels as phase is increased. Stems with a width of n.25 or n.75 pixels move in steps of zero, 0.25 or 0.75 pixels; and stems with an integral width move in steps of zero or one pixel, the same as with the soft-edge policy.

FIG. 6 shows the same character as delivered when the prior-art soft-edge policy is in effect for vertical stems. As is shown, the stem widths are not adjusted, but they are aligned so outside edges are on device pixel boundaries. This is accomplished by making the rasterizer aware of the device pixel boundaries. This policy produces sharper stems (no double gray) but distorts the character. It can result in uneven spacing with adjacent characters. Vertical stems are 5.5 or 6.5 pixels apart. In general, stems move in steps of zero or one pixel as phase is increased. All four phases 60, 61, 62, and 63 are shown, although phases 61, 62, and 63 are identical.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. The essential elements of a computer are a processor for executing instructions and a memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

The invention can be implemented in a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

The invention has been described in terms of particular embodiments. Other embodiments are within the scope of the following claims. For example, steps of the invention can be performed in a different order and still achieve desirable results. Also, the description has implicitly assumed a down-sampling process that performs a simple mapping, such as a box filter, from high-resolution rendering to device pixel values. Other down-sampling processes can be used, however. Furthermore, the pixels of the actual output device need not be square; non-square pixels can be handled by appropriately defining a device matrix component to the current matrix that is used for rendering.

What is claimed is:

1. A system for rendering a character for display in grayscale on a grayscale output device, comprising:

means for defining a coarse grid of cells, each coarse cell corresponding to an output device grayscale pixel, and a high-resolution grid of fine cells, the high-resolution grid being aligned with said coarse grid so that each coarse cell includes an integer number of undivided fine cells, the grids defining edges of the cells;

means for placing a character defined by a font program with reference to the coarse grid and fine grid, the character having a stem hinted with two parallel edges that are placed with reference to the grids when the character is so placed, the stem hint edges being separated by a stem width; and stem aligner means for processing the stem before rendering the character for output on the output device, the stem aligner means comprising means for performing a black-edge hinted stem placement policy, including, means for rounding the stem width to the width of an integral number of fine cells;

means for determining the stem width; and means for, if the stem width is at least one coarse grid cell, moving the stem with rounded width a minimum distance so that at least one of the stem hint edges aligns with a parallel coarse cell edge.

2. The system of claim 1, wherein:

the number of fine cells per coarse cell is determined according to the number of grayscale levels that can be produced by a pixel of the output device.

3. The system of claim 1, wherein:

the number of fine cells per coarse cell is determined by a single, client-selected grid ratio.

4. The system of claim 1, wherein:

the stem aligner means further comprises means for performing an unbiased-stems hinted stem placement policy.

5. The system of claim 4, wherein:

the means for performing an unbiased-stems policy comprise:

means for rounding the stem width to the width of an integral number of fine cells;

means for determining a minimum number of coarse cells that can be spanned by the rounded width of the stem; and means for determining whether the stem spans more than the minimum number of coarse cells and, if it does, for moving the stem a minimum distance so that at least one of the stem hint edges aligns with a parallel coarse cell edge.

6. The system of claim 1, the stem aligner means further comprising:

means for, if the stem width is less than one coarse cell, performing an unbiased stems policy.

7. A system for rendering a character for display in grayscale on a grayscale output device, comprising:

means for defining a coarse grid of cells, each coarse cell corresponding to an output device grayscale pixel, and a high-resolution grid of fine cells, the high-resolution grid being aligned with said coarse grid so that each coarse cell includes an integer number of undivided fine cells;

means for placing a character defined by a font program with reference to the coarse grid and fine grid, the character having a stem hinted with two parallel edges that is placed with reference to the grids when the character is so placed, the stem hint edges being separated by a stem width; and stem aligner means for processing the stem before rendering the character for output on the output device, the stem aligner means comprising means for performing an unbiased-stems hinted stem placement policy, wherein the unbiased-stems policy considers stem spread when determining stem placement.

8. The system of claim 7, wherein:

the number of fine cells per coarse cell is determined by a single, client-selected grid ratio.

9. The system of claim 7, wherein:

the number of fine cells per coarse cell is determined according to the number of grayscale levels that can be produced by a pixel of the output device.

10. The system of claim 7, wherein:

the stem aligner means further comprises means for performing a black-edge hinted stem placement policy.

11. The system of claim 7, wherein the means for performing an unbiased-stems policy comprise:

means for rounding the stem width to the width of an integral number of fine cells;

means for determining a minimum number of coarse cells that can be spanned by the rounded width of the stem; and means for determining whether the stem spans more than the minimum number of coarse cells and, if it does, for moving the stem a minimum distance so that at least one of the stem hint edges aligns with a parallel coarse cell edge.

12. A method for processing a stem of a character outline, comprising:

in one or more computers performing operations comprising:

selecting a hinted stem placement policy from a set of policies comprising at least either a black-edge policy or an unbiased-stems policy, where a black edge policy considers stem width when determining stem placement and an unbiased-stems policy considers stem spread when determining stem placement;

placing a character defined by a font program with reference to a coarse grid and an overlapping fine grid, the character having a stem hinted with two parallel edges that is placed with reference to the grids when the character is so placed, the stem hint edges being separated by a stem width; and processing the stem before rendering the character for output on the output device in accordance with the selected policy, wherein, processing the stem in accordance with the black-edge policy includes:

rounding the stem width to the width of an integral number of fine cells;

determining the stem width; and if the stem width is at least one coarse cell, moving the stem with rounded width a minimum distance so that at least one of the stem edges aligns with a parallel coarse cell edge.

13. The method of claim 12, further comprising processing the stem in accordance with a unbiased-stems policy by:

rounding the stem width to the width of an integral number of fine cells;

determining a minimum number of coarse cells that can be spanned by the rounded width of the stem; and determining whether the stem spans more than the minimum number of coarse cells and, if it does, for moving the stem a minimum distance so that at least one of the stem edges aligns with a parallel coarse cell edge.

14. The method of claim 12, wherein the set of policies comprises both a black-edge policy and an unbiased-stems policy.

15. The method of claim 14, wherein the set of policies further comprises a hard-edge policy and a soft-edge policy.

16. The method of claim 12, wherein the policy is specifically selected for vertical stems or horizontal stems.

17. The method of claim 12, wherein the policy is selected for both vertical stems and horizontal stems.

18. The method of claim 12, further comprising:

selecting a first policy for vertical stems and a different second policy for horizontal stems.

19. The method of claim 12, wherein, processing the stem in accordance with the black-edge policy further includes:

if the stem width is less than one coarse cell, performing an unbiased stems policy.

20. A computer-readable medium encoded with a computer program product for rendering a character for display in grayscale on a grayscale output device, the product comprising instructions operable to cause a programmable processor to:

define a coarse grid of cells, each coarse cell corresponding to an output device grayscale pixel, and a high-resolution grid of fine cells, the high-resolution grid being aligned with said coarse grid so that each coarse cell includes an integer number of undivided fine cells, the grids defining edges of the cells;

place a character defined by a font program with reference to the coarse grid and fine grid, the character having a stem hinted with two parallel edges that are placed with reference to the grids when the character is so placed, the stem hint edges being separated by a stem width; and perform a black-edge hinted stem placement policy, wherein instructions to perform a black-edge hinted stem placement policy comprise instructions to:

round the stem width to the width of an integral number of fine cells;

determine the stem width; and if the stem width is at least one coarse cell, move the stem with rounded width a minimum distance so that at least one of the stem hint edges aligns with a parallel coarse cell edge.

21. The computer-readable medium encoded with the computer program product of claim 20, wherein:

the number of fine cells per coarse cell is determined according to the number of grayscale levels that can be produced by a pixel of the output device.

22. The computer-readable medium encoded with the computer program product of claim 20, wherein:

the number of fine cells per coarse cell is determined by a single, client-selected grid ratio.

23. The computer-readable medium encoded with the computer program product of claim 20, the computer program product further comprising instructions to:

perform an unbiased-stems hinted stem placement policy.

24. The computer-readable medium encoded with the computer program product of claim 20, wherein:

the instructions to perform an unbiased-stems policy comprise instructions to:

round the stem width to the width of an integral number of fine cells;

determine a minimum number of coarse cells that can be spanned by the rounded width of the stem; and determine whether the stem spans more than the minimum number of coarse cells and, if it does, move the stem a minimum distance so that at least one of the stem hint edges aligns with a parallel coarse cell edge.

25. The computer-readable medium encoded with the computer program product of claim 20, wherein instructions to perform a black-edge hinted stem placement policy further comprise instructions to:

if the stem width is less than one coarse cell, perform an unbiased stems policy.

26. A computer-readable medium encoded with a computer program product for rendering a character for display in grayscale on a grayscale output device, the product comprising instructions operable to cause a programmable processor to:

define a coarse grid of cells, each coarse cell corresponding to an output device grayscale pixel, and a high-resolution grid of fine cells, the high-resolution grid being aligned with said coarse grid so that each coarse cell includes an integer number of undivided fine cells, the grids defining edges of the cells;

place a character defined by a font program with reference to the coarse grid and fine grid, the character having a stem hinted with two parallel edges that are placed with reference to the grids when the character is so placed, the stem hint edges being separated by a stem width; and perform an unbiased-stems hinted stem placement policy, wherein the unbiased-stems policy considers stem spread when determining stem placement.

27. The computer-readable medium encoded with the computer program product of claim 26, the computer program product further comprising instructions to:

perform a black-edge hinted stem placement policy.

28. The computer-readable medium encoded with the computer program product of claim 26, wherein instructions operable to perform an unbiased-stems hinted stem placement policy include instructions operable to:

round the stem width to the width of an integral number of fine cells;

determine a minimum number of coarse cells that can be spanned by the rounded width of the stem; and determine whether the stem spans more than the minimum number of coarse cells and, if it does, move the stem a minimum distance so that at least one of the stem hint edges aligns with a parallel coarse cell edge.

29. A computer-readable medium encoded with a computer program product for processing a stem of a character outline, the product comprising instructions operable to cause a programmable processor to:

select a hinted stem placement policy from a set of policies comprising at least either a black-edge policy or an unbiased-stems policy, where a black-edge policy considers stem width when determining stem placement and an unbiased-stems policy considers stem spread when determining stem placement;

place a character defined by a font program with reference to a coarse grid and an overlapping fine grid, the character having a stem hinted with two parallel edges that is placed with reference to the grids when the character is so placed, the stem hint edges being separated by a stem width; and process the stem before rendering the character for output on an output device in accordance with the selected policy, wherein, instructions to process the stem in accordance with a black-edge policy, include instructions to:

round the stem width to the width of an integral number of fine cells;

determine the stem width; and if the stem width is at least one coarse cell, move the stem with rounded width a minimum distance so that at least one of the stem edges aligns with a parallel coarse cell edge.

30. The computer-readable medium encoded with the computer program product of claim 29, the computer program product further comprising instructions to:

process the stem in accordance with a unbiased-stems policy, including instructions to:

round the stem width to the width of an integral number of fine cells;

determine a minimum number of coarse cells that can be spanned by the rounded width of the stem; and determine whether the stem spans more than the minimum number of coarse cells and, if it does, move the stem a minimum distance so that at least one of the stem edges aligns with a parallel coarse cell edge.

31. The computer-readable medium encoded with the computer program product of claim 29, wherein the set of policies comprises both a black-edge policy and an unbiased-stems policy.

32. The computer-readable medium encoded with the computer program product of claim 31, wherein the set of policies further comprises a hard-edge policy and a soft-edge policy.

33. The computer-readable medium encoded with the computer program product of claim 29, wherein the policy is specifically selected for vertical stems or horizontal stems.

34. The computer-readable medium encoded with the computer program product of claim 29, wherein the policy is selected for both vertical stems and horizontal stems.

35. The computer-readable medium encoded with the computer program product of claim 29, further comprising:

selecting a first policy for vertical stems and a different second policy for horizontal stems.

36. The computer-readable medium encoded with the computer program product of claim 29, wherein instructions to process the stem in accordance with a black-edge policy further include instructions to:

if the stem width is less than one coarse cell, perform an unbiased stems policy.

37. A method for rendering a character for display in grayscale on a grayscale output device, comprising:

in one or more computers performing operations comprising:

defining a coarse grid of cells, each coarse cell corresponding to an output device grayscale pixel, and a high-resolution grid of fine cells, the high-resolution grid being aligned with said coarse grid so that each coarse cell includes an integer number of undivided fine cells;

placing a character defined by a font program with reference to the coarse grid and fine grid, the character having a stem hinted with two parallel edges that is placed with reference to the grids when the character is so placed, the stem hint edges being separated by a stem width; and processing the stem before rendering the character for output on the output device including performing an unbiased-stems hinted stem placement policy, wherein the unbiased-stems policy considers stem spread when determining stem placement.

38. The method of claim 37, wherein processing the stem before rendering the character further includes performing a black-edge hinted stem placement policy.

39. The method of claim 37, wherein:

the number of fine cells per coarse cell is determined by a single, client-selected grid ratio.

40. The method of claim 37, wherein:

the number of fine cells per coarse cell is based on the number of grayscale levels that can be produced by a pixel of the output device.

41. A method for rendering a character for display in grayscale on a grayscale output device, comprising:

in one or more computers performing operations comprising:

defining a coarse grid of cells, each coarse cell corresponding to an output device grayscale pixel, and a high-resolution grid of fine cells, the high-resolution grid being aligned with said coarse grid so that each coarse cell includes an integer number of undivided fine cells, the grids defining edges of the cells;

placing a character defined by a font program with reference to the coarse grid and fine grid, the character having a stem hinted with two parallel edges that are placed with reference to the grids when the character is so placed, the stem hint edges being separated by a stem width; and processing the stem before rendering the character for output on the output device, including performing a black-edge hinted stem placement policy, wherein performing a black-edge policy comprises:

rounding the stem width to the width of an integral number of fine cells;

determining the stem width; and if the stem width is at least one coarse cell, moving the stem with rounded width a minimum distance so that at least one of the stem hint edges aligns with a parallel coarse cell edge.

42. The method of claim 41, further comprising, performing an unbiased-stems hinted stem placement policy.

43. The method of claim 42, wherein:

performing an unbiased-stems hinted stem placement policy comprises:

rounding the stem width to the width of an integral number of fine cells;

determining a minimum number of coarse cells that can be spanned by the rounded width of the stem; and determining whether the stem spans more than the minimum number of coarse cells and, if it does, moving the stem a minimum distance so that at least one of the stem hint edges aligns with a parallel coarse cell edge.

44. The method of claim 41, wherein:

the number of fine cells per coarse cell is determined by a single, client-selected grid ratio.

45. The method of claim 41, wherein:

the number of fine cells per coarse cell is based on the number of grayscale levels that can be produced by a pixel of the output device.

46. The method of claim 41, wherein performing a black-edge policy further comprises:

if the stem width is less than one coarse cell, performing an unbiased stems policy.

* * * * *

UNITED STATES PATENT AND TRADEMARK OFFICE

CERTIFICATE OF CORRECTION

PATENT NO. : 7,598,955 B1

APPLICATION NO. : 09/739587
DATED : October 6, 2009
INVENTOR(S) : Dowling et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 218 days.

Signed and Sealed this

Twenty-eighth Day of September, 2010

David J. Kappos

*Director of the United States Patent and Trademark Office*